Oct. 30, 1956  O. E. ANDRUS  2,768,424
METHOD OF MAKING A THERMOPILE
Filed April 20, 1953  2 Sheets-Sheet 1

INVENTOR.
Orrin E. Andrus
BY Andrus & Scales
ATTORNEYS.

Oct. 30, 1956     O. E. ANDRUS     2,768,424
METHOD OF MAKING A THERMOPILE
Filed April 20, 1953     2 Sheets-Sheet 2

INVENTOR.
Orrin E. Andrus
BY Andrus & Sceales
ATTORNEYS.

United States Patent Office 2,768,424
Patented Oct. 30, 1956

2,768,424

METHOD OF MAKING A THERMOPILE

Orrin E. Andrus, Milwaukee, Wis., assignor to A. O. Smith Corporation, Milwaukee, Wis., a corporation of New York Application April 20, 1953, Serial No. 349,697

14 Claims. (Cl. 29—155.5)

This invention relates to a method of making a thermopile particularly adapted to provide a continuous source of potential for certain cathodic protection installations used to prevent corrosion of metal.

One object of the invention is to produce a thermopile having relatively long life by preventing relative movement of the metal parts and its resultant rupturing effect on the metal parts.

A further object is to produce a dependable thermopile of long life by sealing the unit from contact with air or flue gases which would deteriorate the thermopile.

Another object is to make a thermopile having hot and cold junctions that are physically strong at the area where dissimilar metals join.

Another object is to compact the insulation between the conductors of the thermopile so that this insulation cannot move relative to the wire, which movement would allow electrical shorts to develope within the thermopile.

Another object is to provide a thermopile which is adaptable to manufacture by low-cost production means.

A further object is to provide a thermopile of compact construction to enable operation thereof by a small source of heat.

A further object is to provide between the conductors of the thermopile long-lived refractory insulation which is not subject to plastic flow as a result of operating temperature.

The construction of an inexpensive long-lived thermopile for operation by the heat from a heating element or pilot necessitates a very compact construction having compact refractory insulation capable of withstanding the destructive forces of expansion and contraction resulting from repeated operations of heating and cooling. The thermopile conductors of the invention are individually separated by a refractory material such as glass fibers. The thermopile unit is encased in a metal protection tube which is swaged to compress the conductors and insulation so that electrical short circuits cannot develop.

In general, the invention is directed to both the design and manufacture of a thermopile in which a wire is made up of alternate lengths of metals having dissimilar thermoelectric properties, in which one or more layers of electrical insulation is applied to this thermopile wire, in which the insulated thermopile wire is compacted into a bundle so that the alternate junctons between the different metals are at, or near, the respective hot and cold junctions of the bundle, in which the bundle is placed within a metal tube and the tube swaged to compact the wires to thereby restrain relative movement of both the wires and the insulation during the operating life of the unit, and in which the insulating material confined by the ends of the tubular enclosure is likewise compacted for similar reasons.

Other objects of the invention will appear hereinafter in connection with the following description of the drawings illustrating several embodiments of the invention.

A thermocouple is usually made of two conductors having dissimilar thermo-electric properties and is usually joined together at two junctions so as to generate an electrical potential when one junction is raised to a higher temperature than the other junction. It is common practice to place a number of thermocouples in series to form a thermopile unit which will generate an electrical potential essentially proportional to the number of thermocouples provided in the thermopile. Heretofore it has not been feasible to provide a long-lived thermopile having many thermocouples in series for operation by a single small pilot flame or heat source such that the thermopile is protected from direct contact with the gases from the pilot flame. Although thermocouples and thermopiles may take different forms and shapes, this invention is directed to a thermopile made from a wire having alternate sections of metals possessing different thermo-electric properties and insulated throughout its length. This insulated thermopile wire is folded and compacted within a flame-resistant protection tube so that the wire and insulating material are restrained securely against relative movement which would cause failure of the unit through insulation failure with resultant contact of portions of the wire with each other or with the enclosing casing or against relative movement of parts of the structure which would cause failure through rupture of the wire as a result of the concentrations of forces of expansion and contraction.

The method of the invention has numerous variations which will be described.

Figure 1:
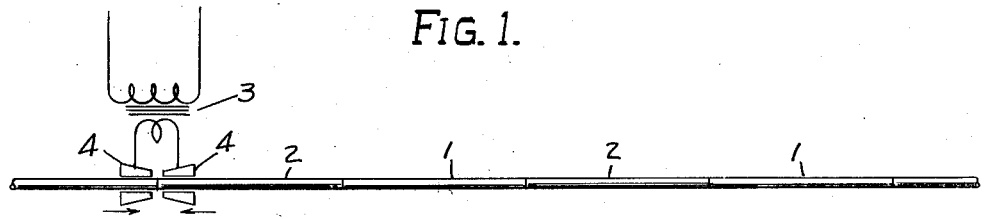
Figure 1 is a side elevational view, partially in section, schematically showing one method of producing a thermopile wire by welding alternate lengths of suitable dissimilar metals end to end.

In Figure 1 there is illustrated a continuous conductor which has been formed by welding together alternately end to end wires 1 of alumel and wires 2 of chromel. Any suitable combination of materials and shapes may be employed. The alumel and chromel wires here described are given only for purposes of illustration. The welding as shown is accomplished by passage of a current of high density across the joint between wires 1 and 2 as by means of a resistance welding transformer 3 connected to the welding chucks 4 which force the wires together. Other methods of welding the wires together, such as by percussive of flash welding means, may be utilized. Following the butt welding operation means such as grinding may be used to remove excess metal at the junctions.

Figure 2:
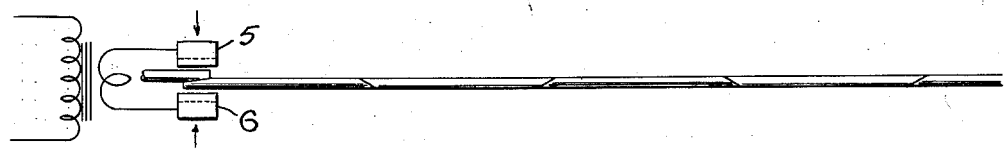
Fig. 2 is a side elevational view, partly in section, schematically showing another method of producing a thermopile wire by welding alternate lengths of suitable dissimilar metals by over-lapping the ends.

Although wires may be joined together by butt welding as shown schematically in Figure 1, it is also possible to use an overlap resistance weld as shown schematically in Fig. 2. In the latter case wires 1 and 2 are joined together by the passage of a high density current across the joint which is forced together by the electrodes 5 and 6. It has been found advantageous to shield the joint between wires 1 and 2 in an atmosphere of inert gas during the welding operation. It is preferable that the resultant wire be of uniform cross-section throughout.

Figure 3:
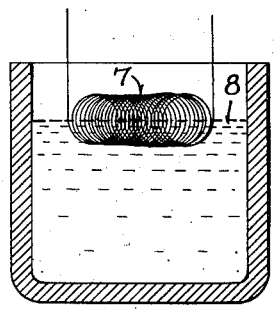
Fig. 3 is a side elevational view, partly in section, schematically showing still another method of producing a thermopile wire by converting a wire of one composition into a wire having alternate sections of different compositions by means of diffusion of an alloying element into alternate sections of the wire.

This invention is not limited to the method of producing a thermopile wire made of alternate sections of wire having different thermo-electric properties. For instance, in Fig. 3 a means is shown for changing the composition of alternate sections of a wire by the diffusion of chemical elements into such sections of the wire. For example, a wire of copper can be changed into a wire of alternate sections of copper and brass by dipping alternate sections of the wire into hot molten zinc and alloying the two metals by heating in an inert atmosphere for a period of time. A simple means of accomplishing this is to dip part of a coil 7 of copper wire into molten zinc 8 held at high temperature. To prevent appreciable solution of the copper wire into the molten zinc, it is preferable following the dipping operation to remove the coil and heat it for the necessary period to give the desired degree of diffusion. Numerous combinations of elements can be accomplished in this manner at very low cost.

Figure 4:
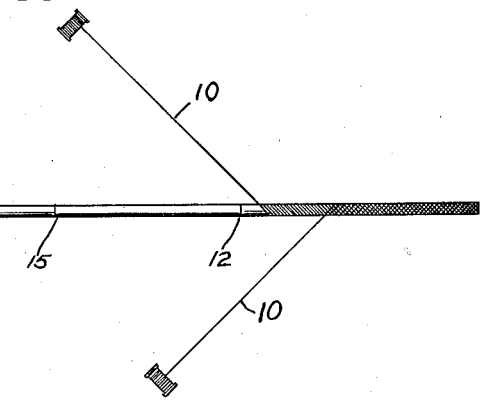
Fig. 4 is a side elevational view, illustrating the wrapping of a thermopile wire.

Next, the bare thermopile wire 9 made of alternate sections of essentially equal lengths of metal of differing thermoelectric properties, is preferably wrapped with one or more layers of fibrous electrically insulating material 10, such as glass fiber or asbestos cord, as illustrated in Fig. 4 to insure separation of the adjacent portions of the insulated thermopile wire when this wire is folded and bundled together. It may be desirable to employ a high silica glass produced as by dissolving metal oxides from silicate glass. This latter type of glass fiber has the advantage of being resistant to high temperatures.

Instead of using insulating fibers, the welded wire may be coated with a powdered or granulated material like magnesium oxide, silicon dioxide, or glass. The powder may be applied to the folded wire as a slurry, and dried before the thermopile is bundled together, as will be described.

Figures 5, 6:
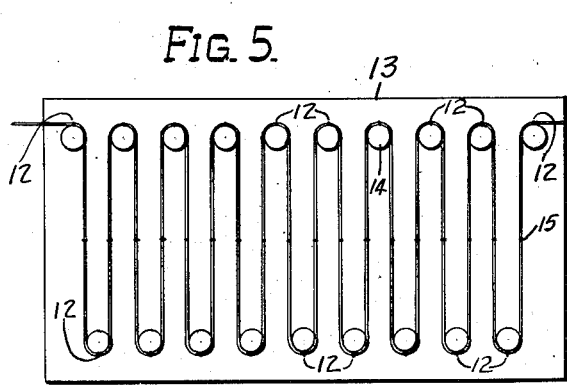
Fig. 5 is a schematic view showing the folding of the wrapped thermopile wire upon a form preparatory to bundling the thermopile for insertion into a protection tube.
Fig. 6 is a schematic view showing an alternative way of folding and wrapping of the thermopile wire before bundling the thermopile for insertion into a protection tube.

In the preferred form of the invention, the bare thermopile wire is wrapped with insulating fiber before it is folded as illustrated in Fig. 5. In this operation of folding, the wrapped thermopile wire 11 is bent at every other junction 12 where differing compositions of wire contact one another. One way of accomplishing this is by use of form 13 having pegs 14. The bending or forming of the insulated thermopile wire 11 is accomplished in a manner to dispose alternate junctions 12 along opposite edges of the form 13 as the future cold junctions of the thermopile. Junctions 15 then lie essentially centrally between the two edges of the form as the future hot junctions.

An alternative method of covering the wire, schematically shown in Fig. 6, is to fold the bare thermopile wire on the pegs 16 of frame 17 of a loom, not shown, and then weave therethrough a fiberglas cord 18 or the like to form a fabric-like structure.

Figure 7:
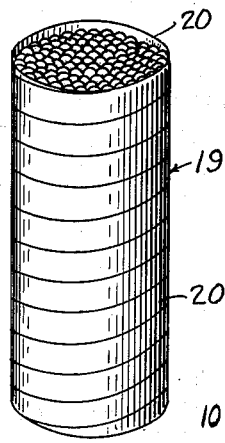
Fig. 7 is a perspective view showing a folded thermopile wire of uniform cross-section bundled together into a rod-shaped thermopile.

After the operation of folding the insulated thermopile wire is completed, the bent or folded sections of the wire are removed from form 13 and either rolled up or bunched together into a compact bundle 19, as illustrated in Fig. 7 to provide a bundled thermopile. The bundle is made as small as possible in cross-sectional area and is preferably wrapped on the outside with glass tape 20 or the like to hold it in place and to further insulate the outside surface. The bundle 19 is a compact thermopile, with the junctions 15 centrally of the top and bottom as the future hot junctions and the junctions 12 at the top and bottom as the future cold junctions.

The future hot and cold junctions may also be disposed on opposite ends of the thermopile bundle by disposing them at the respective opposite ends of the form 13 of Fig. 5. To accomplish this, the insulated wire is bent at each of the alternate junctions 12 and 15 where differing compositions of wire contact one another.

The bundled thermopile having centrally located hot junctions is the more desirable in that it provides a thermopile having a reduced cross-section and having unbent hot junctions.

In the operations of folding and bundling the thermopile wire, the junctions 12 may be bent sharply or they may be bent with a distinct radius. It has been found that a radius greater than the diameter of the wire is advantageous.

Although the thermopile has been described as being formed into a rod-shaped bundle, it may be otherwise bundled in any manner which disposes the hot junctions essentially adjacent one another to be heated from a single source; for example, a thermopile might be made in the shape of a doughnut.

After the thermopile has thus been formed, it may be heated to oxidize or otherwise remove any organic matter thereon. Although it is preferable to remove the organic matter at this point, the removal may be subsequently executed, for example, after the thermopile has been inserted in the protective tube as hereinafter described.

Figure 8:
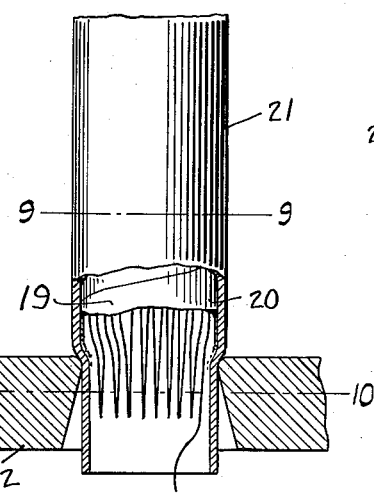
Fig. 8 is a view in elevation and partially in section schematically illustrating one way of swaging the tube and thermopile into a compact unit to thereby restrain the metal parts against relative movement.

As shown in Fig. 8, the bundled thermopile 19 is next inserted into a metal protection tube 21 of a generally cylindrical shape. It is preferable to make this protection tube from a heat-resisting, high chromium bearing alloy.

Following insertion of the thermopile, the protection tube 21 is swaged as by die 22 to a diameter to thoroughly and solidly compact the insulating material between all conductors so that there can be essentially no relative motion between adjacent portions of the wire of the pile, or between the conductor and the tube 21 as a result of changes in temperature or mechanical shock.

In this swaging operation, which may consist of one or more passes through dies, of decreasing internal diameter, the insulation is subjected to pressures which deform the outer layers of insulation on each section of the wire. It is, therefore, important that each section of wire be covered with sufficient thickness of insulating material, so that when the material deforms under the forces introduced by swaging, there will be sufficient material to essentially fill all voids, and, at the same time, separate each portion of the wire from other portions with a compact insulating layer which cannot be physically displaced as a result of temperature change or mechanical shock.

Figure 9:
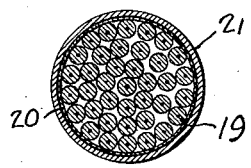
Fig. 9 is a section taken on line 9—9 of Fig. 8.
Figure 10:
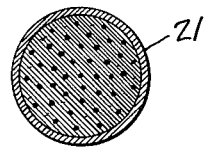
Fig. 10 is a section taken on line 10—10 of Fig. 8 across the swaged portion of the thermopile to illustrate the compacting of the wires and the insulating of the thermopile during and after the swaging operation.

Figs. 9 and 10 respectively illustrate the relationship of the parts of the thermopile before and after swaging. In Fig. 9 illustrating the structure before swaging, there are voids between the wrapped thermopile wires. In Fig. 10 illustrating the structure after swaging, there are essentially no voids and the wires are quite evenly separated by insulating material that is densely compacted.

Figure 11:
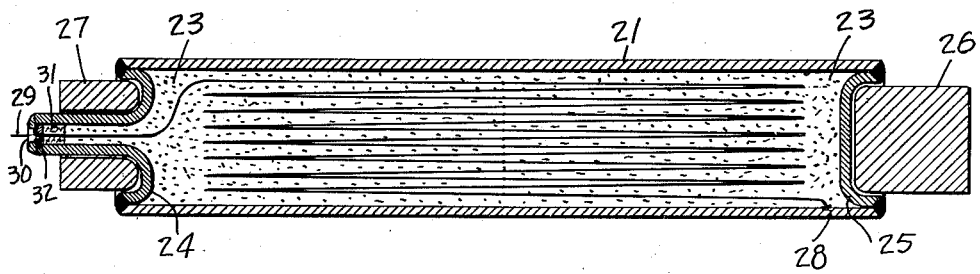
Fig. 11 is a sectional view slightly enlarged, illustrating the sealing of the ends of a thermopile protective tube.

Following the swaging of the protection tube 21 around the thermopile bundle 19, the ends of the protection tube are closed preferably as shown in Fig. 11 in such a manner as to hermetically seal the ends of the unit. Insulating material such as powdered glass 23, sand, or the like, is disposed in the end regions of the swaged thermopile tube prior to the insertion of the end plugs 24 and 25. Force is applied to these end plugs as by means of dies 26 and 27 to compact the insulating material so that relative motion of the wire and the insulating material cannot take place to a destructive degree in the end regions of the thermopile. The plugs are then welded, brazed, or otherwise held in position.

The thermopile wire terminates in a negative terminal 28 which may be welded to the protection tube 21 and a positive terminal 29 which may extend through the opening 30 of the plug 24.

Plug 24 may be hermetically sealed in any desired manner, such as by the means illustrated and described in my copending application entitled, "Sealed Thermopile," filed April 20, 1953, Serial No. 349,696, now Patent No. 2,703,335, issued March 1, 1956. A compressed flexible seal member 31 is held within the end of plug 24 by crimping the end of plug 24 over a washer 32 disposed between the member and crimped end of the tube.

Figure 12:
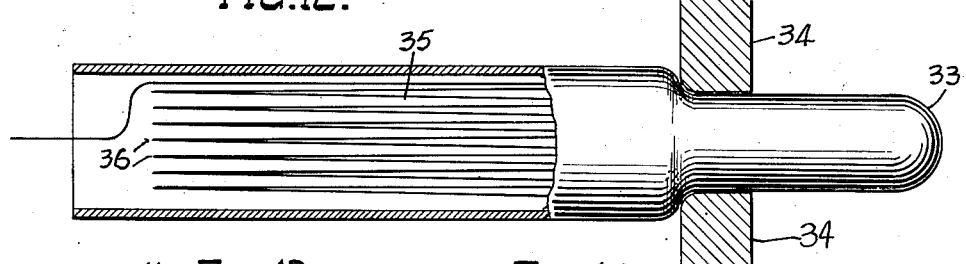
Fig. 12 is a view in elevation and partially in section, illustrating one way of swaging a closed end tube and a thermopile into a compact unit to thereby restrain the metal parts against relative movement.

Another modification of the invention is shown schematically in Fig. 12 in which a protection tube is used having one end 33 closed prior to the introduction of the thermopile bundle. In this illustration the relative motion of the dies 34 of a swaging machine progressively swages the tube onto the thermopile bundle 35.

In the modification illustrated in Fig. 12, the thermopile bundle 35 has the hot junctions, not shown, at the end of the bundle adjacent the closed end of the tube. The cold junctions 36 lie at the opposite end of the bundle.

Figure 13:
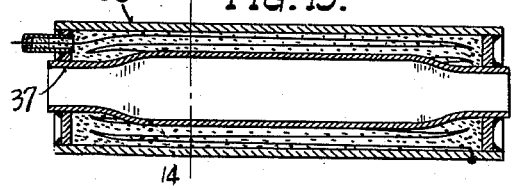
Fig. 13 is a view in section of an alternative way of compacting the thermopile to restrain the metal parts against relative movement.
Figure 14:
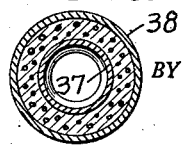
Fig. 14 is a section taken on line 14—14 of Fig. 13.

Thus, it may be seen that swaging of the protection tube may be accomplished in various ways. As illustrated in Figs. 13 and 14 it is also possible to employ an inner concentric tube 37 lying within the thermopile bundle which is housed by the protection tube 38 to reduce the effective volume of the tube for housing the thermopile bundle. In this case, the inner tube 37 is expanded to compress the wires and insulation into a compact structure within the protection tube 38.

It lies within the scope of this invention to apply the insulation to the thermopile wire before or after the folding operation. Although a wrapped insulation has been described in the illustration, it lies within the scope of the invention to use other forms of insulating material such as powdered materials applied as a slurry.

Various embodiments of the invention may be employed within the scope of the following claims.

I claim:

1. In the method of constructing an insulated thermopile which comprises, forming a continuous wire-like conductor of alternate essentially equal lengths of wire having dissimilar thermo-electric properties, covering said continuous conductor with a heat resistant electrically insulating material, folding said continuous conductor into a bundle to form a thermopile with the future hot junctions thereof adjacent each other to be heated from a single source of heat, placing the bundle in a metallic casing, and reducing the volume of the casing to deform the covering on the conductor and thereby tightly compact the insulating material surrounding the conductor.

2. In the method of constructing an insulated thermopile which comprises, forming a continuous conductor by bonding together alternate wire-like conductors of dissimilar metals, covering said continuous conductor with a refractory electrically insulating material, folding said continuous conductor into a bundled thermopile of spaced elements with the future hot junctions thereof adjacent each other to be heated from a single source of heat, placing the bundle in a metallic casing, and reducing the volume of the casing to tightly compact the insulating material surrounding the conductor and substantially eliminate the voids between the spaced elements.

3. The method of constructing a hermetically sealed and insulated thermopile which comprises, forming a continuous wire-like conductor of alternate essentially equal lengths of wire having dissimilar thermo-electric properties, covering said continuous conductor with electrically insulating material, folding said conductor into a bundled thermopile with the future hot junctions adjacent each other to be heated from a single source of heat, placing said bundled thermopile in a metallic casing with the lead of the thermopile extending therefrom for connection to an electrical circuit, hermetically sealing said casing about the thermopile lead to prevent entrance of injurious foreign matter to the thermopile, and reducing the volume of the casing to tightly compact the insulating material.

4. In the method of constructing an insulated thermopile which comprises, forming a continuous wire-like conductor of alternate essentially equal lengths of wire having dissimilar thermo-electric properties, covering said conductor with a refractory electrically insulating material, folding said conductor into a rod-shaped bundle with junctions of the dissimilar thermo-electric lengths of wire at the ends of the bundle, placing the rod-like bundle into a metallic casing so that the axis of the bundle is parallel to the axis of the casing and reducing the volume of the casing to deform the insulating material covering the conductor and thereby tightly compact the insulating material surrounding the conductor.

5. In the method of constructing an insulated thermopile which comprises, forming a continuous wire-like conductor having junctions between alternate substantially equal lengths of wire possessing dissimilar thermo-electric properties, covering said conductor with electrically insulating heat resistant material, folding said conductor into a rod-shaped bundle to dispose every other junction at the respective opposite ends of the bundle and to dispose the balance of the junctions at the center of the bundle, placing said rod-shaped bundle into a heat resistant metallic tubular casing so that the axis of the bundle is parallel to the axis of the casing, and reducing the volume of the tubular casing to tightly compact the insulating material surrounding the conductor and eliminate voids within the folded conductor.

6. In the method of constructing a thermopile which comprises, forming a continuous conductor by bonding together alternate wire-like conductors of dissimilar metals, covering said single conductor with a refractory electrically insulating material, folding said single conductor into a rod-shaped bundle to dispose the junctions of the dissimilar metals of the conductor at the ends and center of the bundle, inserting said rod-shaped bundle into a metallic tubular casing so that the axis of the bundle is parallel to the axis of the casing, and reducing the volume of the tubular casing to tightly compact the insulating material covering each portion of the conductor and thereby eliminate voids adjacent the folded conductor.

7. In the method of constructing an insulated thermopile which comprises, forming a continuous conductor by bonding together alternate wire-like conductors of dissimilar metal, covering the single conductor with a heat resistant electrically insulating material, folding said single conductor into a rod-shaped bundle to form a thermopile with the future hot junctions thereof adjacent one another to be heated from a single source of heat, inserting said rod-shaped bundle into a metallic tube, swaging the tube to tightly compact the insulating material surrounding the bonded conductor, filling the ends of the tube with electrically insulating material, and then hermetically sealing the ends of the tube to prevent the entrance of injurious foreign matter into the thermopile.

8. In the method of constructing an insulated thermopile which comprises, forming a continuous slender rod-shaped conductor of alternate equal lengths of conductor having dissimilar thermo-electric properties, covering said continuous conductor with a heat resistant electrically insulating material, folding said continuous conductor into a rod-shaped bundle with the future hot junctions of the thermopile so formed disposed adjacent each other to be heated from a single source of heat, heating the bundle to drive off any organic matter therein, inserting said rod-shaped bundle into a metallic casing, and reducing the volume of the casing to thoroughly compact the insulating material covering the conductor.

9. The method of constructing an insulated thermopile which comprises, forming a continuous conductor by bonding together alternate wire-like members of dissimilar metals, covering the conductor with a refractory electrically insulating material, folding said conductor into a rod-shaped bundle to dispose every other junction of dissimilar metal at the respective opposite ends of the bundle and with the balance of the junctions at the center of the bundle, wrapping said rod-shaped bundle with insulating material to hold the conductors in place and to further insulate the outside surface, inserting said rod-shaped bundle into a heat resistant metallic casing, reducing the volume of the casing to thoroughly compact the insulating material.

10. In the method of constructing an insulated thermopile which comprises, forming a continuous conductor of alternate equal lengths of slender rod-shaped conductors having dissimilar thermo-electric properties, coating the conductor with a refractory electrically insulating material, folding said conductor into a rod-shaped bundle to dispose said alternate junctions of the conductor at the respective opposite ends of the bundle, placing said rod-shaped bundle into a metallic tube so that the axis of the bundle is parallel to the axis of the tube, and reducing the cross-section of the tube to crush the electrically insulating material and tightly compact the insulating material surrounding the welded conductor.

11. A method of constructing an electrically insulated thermopile comprising the steps of forming a continuous conductor by bonding together alternate conductors of dissimilar metals, covering said single conductor with electrically insulating fiber glass, folding the continuous conductor into a rod-like bundle so that alternate junctions of the continuous conductor are disposed at opposite ends of the bundle, placing said rod-like bundle into a heat resistant metallic tube so that the axis of the bundle is parallel to the axis of the tube, swaging the tube to deform and tightly compact the insulating fiber glass surrounding the bonded conductor to eliminate voids, filling the ends of the tube with electrically insulating material, sealing the ends of the tube with plugs which tightly compact the insulating material surrounding the end junctions of the bundle, and sealing the lead terminals of the thermopile to hermetically enclose the thermopile against the entrance of damaging elements.

12. In the method of constructing an insulated thermopile which comprises, forming a single wire-like conductor of alternate equal lengths of wire having dissimilar thermo-electric properties, covering said conductor with glass fibers, folding said conductor into a rod-like bundle to dispose junctions of dissimilar thermo-electric properties of the conductor at opposite ends of the bundle to form a thermopile of closely spaced longitudinal conductors, inserting the rod-like bundle into a heat resistant metallic tube with the axis of the bundle parallel to the axis of the tube, and reducing the volume of the tube to crush the glass fibers and thereby thoroughly compact the glass fibers covering the folded conductor and eliminate voids.

13. In the method of constructing an insulated thermopile which comprises, changing the composition of equal alternate sections of a wire by the diffusion of chemical elements into the alternate sections, coating the wire with an electrically insulating refractory material, folding the wire into a generally rod-shaped bundle to form a thermopile with the future hot junctions thereof adjacent each other to be heated from a single source of heat, inserting said generally rod-shaped bundle in a metallic casing with the axis of the bundle parallel to the axis of the casing, and reducing the volume of the casing to thereby thoroughly compact the insulating material coating the wire and eliminate voids within the rod-shaped bundle.

14. In the method of constructing an insulated thermopile which comprises, changing the composition of essentially equal alternate lengths of a wire by the diffusion of chemical elements into the alternate lengths, covering the wire with glass fibers, folding the covered wire into a bundle to form a thermopile with the future hot junctions thereof adjacent each other to be heated from a single source of heat, placing the bundle in a metallic casing, and reducing the volume of the casing to crush the glass fibers and thereby thoroughly compact the insulating material covering the wire and eliminate voids within the thermopile.

References Cited in the file of this patent

UNITED STATES PATENTS

| | | |
|---|---|---|
| 781,288 | Marsh | Jan. 31, 1905 |
| 1,227,346 | Trood et al. | May 22, 1917 |
| 1,664,720 | Woodruff | Apr. 3, 1928 |
| 1,669,385 | Wiegand et al. | May 8, 1928 |
| 2,310,026 | Higley | Feb. 2, 1943 |
| 2,605,296 | Bodey | July 29, 1952 |
| 2,632,833 | Huck et al. | Mar. 24, 1953 |

FOREIGN PATENTS

| | | |
|---|---|---|
| 144,757 | Great Britain | June 18, 1920 |